United States Patent [19]
Daniels et al.

[11] 3,719,255
[45] March 6, 1973

[54] ENERGY ABSORBING DEVICE

[75] Inventors: Clare G. Daniels, El Toro; Bernard Mazelsky, W. Covina, both of Calif.

[73] Assignee: ARA, Inc. (Aerospace Research Associates, Inc.), West Covina, Calif.

[22] Filed: April 21, 1969

[21] Appl. No.: 817,979

[52] U.S. Cl. .................................................. 188/1 C
[51] Int. Cl. ................................................. F16f 7/12
[58] Field of Search ....................................... 188/1 C

[56] References Cited

UNITED STATES PATENTS 3,435,919   4/1969   Gularte et al. ..................... 188/1 C

*Primary Examiner*—Duane A. Reger
*Attorney*—Herzig & Walsh

[57] ABSTRACT

The device is an energy absorbing arrangement in which a flexible tube-like, energy absorbing member is confined in a space between one relatively rigid body member and another. They may deform elastically but not plastically. Relative motion between one body member and the other body member roll the tube-like in the space, and thereby absorbs energy in the rolling due to the cyclical plastic deformation or hysteretic deformation thereof, since the spacing between the one body member and the other body member is less than the unstressed and undeformed diameter of the flexible, tube-like member. A nondeformable rigid cylindrical retainer means is positioned within the flexible tube-like member to limit the radial deformation thereof to prevent stress relieving plastic flow or creep of the flexible tube-like energy absorbing member. The rigid body members may be cylindrical with an annular space between them.

3 Claims, 6 Drawing Figures

PATENTED MAR 6 1973 3,719,255
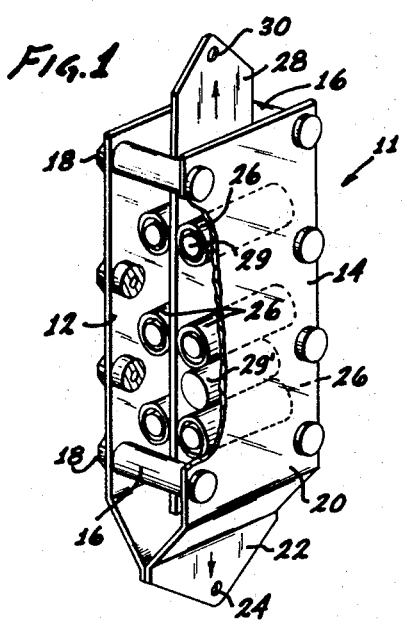
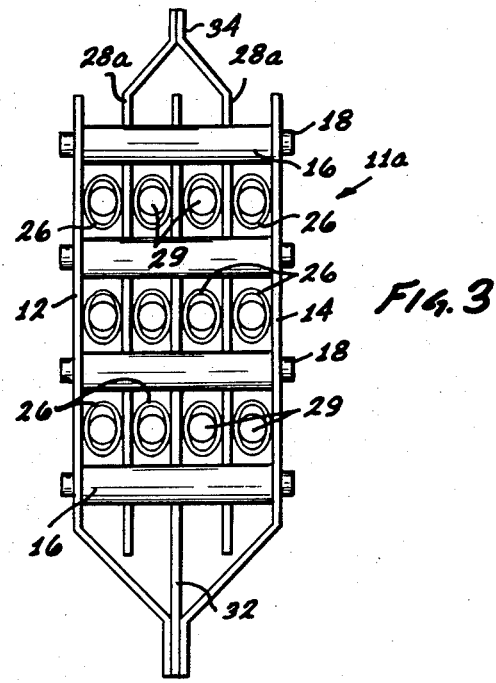
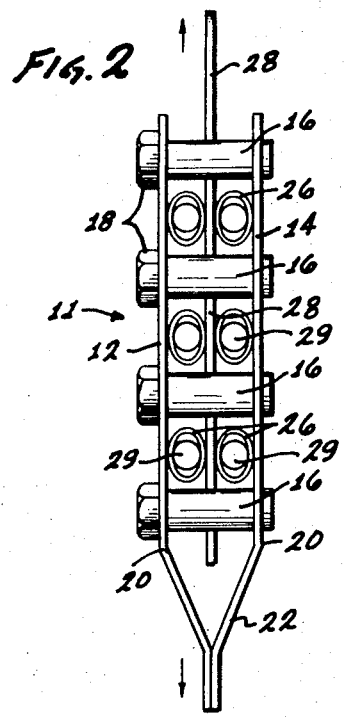
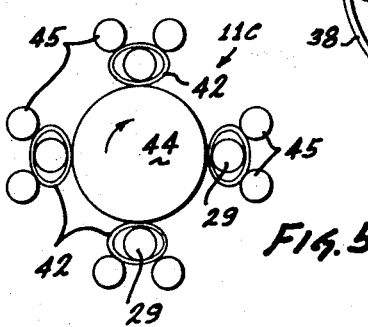
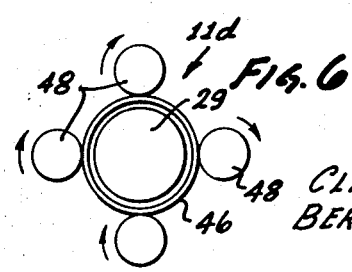
INVENTORS
CLARE G. DANIELS
BERNARD MAZELSKY
BY Herzig & Walsh
ATTORNEYS

ENERGY ABSORBING DEVICE

SUMMARY OF THE INVENTION

This invention relates to an improved energy absorbing device or arrangement capable of providing relatively high energy absorbing rates with a high degree of design flexibility.

In many energy absorbing applications, it is desirable to absorb energy in a strut-like arrangement in which linear motion is produced and during such linear motion, the energy is to be absorbed. Such applications, might include collapsible steering columns in automobiles, seats mounting structures, in vehicles, landing struts of space vehicles, overload devices, and the like.

Consequently, there is a need for a lightweight, high energy absorption rate device or arrangement that allows considerable design flexibility and yet is easy to fabricate, and economical to fabricate.

Accordingly, it is the object of the invention herein to provide improved energy absorbing arrangements, having capabilities as outlined in the foregoing.

It is another object of the invention to provide an energy absorbing arrangement in which design flexibility is provided.

Another object of the invention is to provide an energy absorbing arrangement that is easy to fabricate and comparatively low in cost.

Another object is to realize increased capabilities as to stability and to make it possible to operate it higher compressive forces (squeeze) and higher operating (rolling) forces.

The above and other objects are achieved, according to one embodiment of applicant's invention by providing energy absorption through the cyclic plastic deformation of a plurality of radially compressed tube-like members, that is, the tube-like members are compressed along a diameter thereof, and mandrels or dowels are provided within the tubes to limit compression thereof.

In this embodiment, there is provided a first body member positioned adjacent another rigid body member. One body member is spaced a preselected distance from the other body member.

A flexible, tube-like energy absorbing means is positioned between the body members and the flexible, tube-like energy absorbing means has an unstressed radial dimension that is a preselected amount greater than the spacing between the inner body member. Thus, the flexible, tube-like energy absorbing member is radially dimensionally deformed to provide a deformed radial dimension that is less than the unstressed dimension and thereby is provided a predetermined stress distribution around the energy absorbing means. Within at least some of the energy absorbing members, or positioned between them are solid cylindrical dowels or mandrels that limit the squeezing of the tube-like members. In addition, the pins prevent the annulus from becoming non-uniform around the circumference when a side load is applied (as opposed to a pure torque) as shown above.

The flexibility of the energy absorbing means stems from the configuration in which driving rolling motion thereof upon relative axial motion between the body members achieves the capability, that substantially no energy absorption occurs to the cyclic tension-compression of the longitudinal fibers thereof, but rather the relatively greater energy absorption capability is achieved by the cyclic bending in the plane of the cross-section, that is, in the circumferential direction of the tube-like members.

In a second embodiment of the present invention, both pressure plates (body members) are employed in conjunction with a pair of driving plates so that a wider range of design parameters is offered in comparison with the device having a single driving plate.

In other embodiments of the present invention, rotary motion is attenuated by employing two concentric drums which rotate relative to each other and drive a series of tubular working elements compressed laterally in the annular region between the drums. Also there may be employed a ring of working elements which is driven by a central contacting drum wherein the working elements are rotated in a fixed position with the aid of pairs of bearing guide rollers. Also, a single central working tube may be driven by a peripheral ring of drivers.

In all embodiments of the present invention, the tubular working elements are deformed into a predetermined plastic strain range of from about 0.1 percent to about 10 percent.

The present invention, both as to its organization and manner of operation, together with further objects and advantages thereof, may best be understood by reference to the following description, taken in connection with the accompanying drawings, in which like reference characters refer to like elements in the several views.

FIG. 1 is perspective view with parts broken away showing an energy absorbing device constituting a first embodiment of the present invention;

FIG. 2 is an end view of the device of FIG. 1;

FIG. 3 is an end view of the device constituting a second embodiment of the present invention;

FIG. 4 is an end view of any energy absorbing device constituting a third embodiment of the present invention;

FIG. 5 is an end view of any energy absorbing device constituting a fourth embodiment of the present invention;

FIG. 6 is an end view of an energy absorbing device constituting a fifth embodiment of the present invention.

The herein invention is a variation of the invention disclosed in U.S. Pat. No. 3,301,351 and U.S. Pat. No. 3,231,049.

As indicated in the foregoing, the invention is concerned with devices for energy absorption involving the cyclic plastic deformation of metallic tubular materials and the application of this concept to both linear and rotary configurations. The herein invention is concerned with a practical, compact, lightweight device using the "rolling tube" principal or mechanism capable of operating at high force levels, the rolling tube principal itself being shown in U.S. Pat. No. 3,301,351.

In the embodiments of the invention described hereinafter preferably Type 304 stainless steel tubular elements are utilized although other materials may be used. This material is especially attractive for this utilization because of its ductility, strength, fatigue behavior (especially ability to undergo many reversible cycles of strain well into the plastic region without failure), resistance to weathering and environmental variations, strain rate and sensitivity and ready commercial availability in various sizes. Because of simplicity, friction is utilized as the means for driving the tubular elements to produce rolling thereof, although it is to be recognized that other mechanisms such as rack and pinion, card spool, etc. may also be employed with appropriate modifications.

Referring now to FIGS. 1 and 2, a device constituting a first embodiment of the present invention, generally designated 11, includes a pair of pressure plates or bodies 12, 14 which are connected together in spaced, parallel relationship by a plurality of spacers 16 and bolt and nut assemblies 18. The ends 20 of the plates 12 and 14 are tied together by a Y-shaped member 22 which is provided with an aperture 24 so that the device 11 can be connected to an apparatus to be subjected to shock loads which may be transmitted to the device 11 and absorbed thereby.

A plurality of working elements or tubes 26 are mounted in aligned pairs between the pressure plates 12 and 14. A center driving plate 28 is then inserted into the device 11 to separate the respective pairs of working tubes 26. The tubes 26 are plastically deformed by being compressed laterally between the driving plate 28 and an associated pressure plate 12 or 14 by adjusting the bolt and nut assemblies. The tubes 26 may be deformed into the plastic range of deformation until they have a predetermined offset value within the range of 0.1 percent to 10 percent, depending upon the amount of shock to be absorbed by the device 11. Pressure plates 12 and 14 while being substantially rigid are subject to some limited "give" or deformation.

An aperture 30 is provided in the driving plate 28 so that it can be connected in an energy absorbing system. The device 11 may be employed in a number of energy absorption applications in which a precisely engineered design is required. For example, the device 11 may be employed as mechanical "fuse" on a guy wire which is subjected to design loads for long periods of time and, in the event of an earthquake, for example, the device 11 would protect the cable from serious overload. The overload would be absorbed by the tubes 26 by cyclic bending from the constant rolling force imparted thereto by the center driving plate 28 and the outer pressure plates 12 and 14 as they translate with respect to each other.

Deformation of the tubes is limited by solid cylindrical dowels or mandrels 29 within the tubes, these dowels being of smaller diameter. Stability is greatly improved with the dowels. Units can be designed to operate at substantially higher compressive force (squeeze) thereby developing much higher operating (rolling) forces.

Referring now to FIG. 3, a second embodiment of the present invention, generally designated 11a, is identical to the first embodiment except that twice as many tubes are employed by using an inner pressure plate 32 in addition to the other pressure plates 12 and 14 and by employing a pair of driving plates 28a which may be tied together at one end by a Y-shaped member 34. Spacers 16 and bolt and nut assemblies 18 and employed as in the previous embodiment and may be adjusted to deform the tubes 26 a predetermined amount. The dowels are shown at 29.

A third embodiment of the invention, generally designated 11b, is shown in FIG. 4. The device 11b comprises a pair of concentric drums 36, 38 which are adapted to rotate relative to each other and drive a series of tubular working elements 40. The tubular elements 40 may be made of a metal, such as stainless steel, and are compressed laterally in the annular region between drums 36 and 38 a predetermined amount so that they are deformed into the aforementioned predetermined plastic strain range, deformation being limited by dowels 29 which could also be positioned between the tubes.

A device constituting a fourth embodiment of the present invention, generally designated 11c, is shown in FIG. 5 and comprises a ring of working elements or tubes 42 which are driven by a central, contacting drum 44. A pair of guide bearing rollers 45 is provided for each tube 42 so that the tubes 42 will be rotated in a fixed position by the drum 44. As in the previous embodiments, the tubes 42 are preferably made of metal and are laterally compressed until they are deformed into a predetermined plastic strain range of about 0.1 percent to about 10 percent.

Referring now to FIG. 6, a fifth embodiment of the present invention, generally designated 11d, comprises a single working tube 46 which is driven by a peripheral ring of drivers 48. The drivers 48 deform the tube 46 into the aforementioned plastic strain range. The shock absorber 11d offers advantages for high-energy applications in which the working element would be simply replaced periodically. The shock absorbers 11c and 11d offer added flexibility and a possible advantage in that the more complex modes of deformation produce more material cycles per revolution of working tube. Again deformation is limited by dowel 29 of smaller diameter.

Test data was obtained on a rolling tube device constructed in accordance with FIG. 1 to 6. Stainless steel tubing of 0.25 inch o.d. one inch length was utilized. Tubing of various thicknesses were varied, e.g., from 0.013 inch to 0.049 inch in order to provide a sufficient range to permit design of practical operational rolling tube energy absorbers. The dowels dimensions were varied to accomodate the tube diameters, e.g., from 0.144 inch to 0.216 inch. Four tubes of identical dimensions were used for each measurement, two tubes located on each side of the enter driving plate. The two outer pressure plates were one inch thick type A2 tooling steel; the center driving plate was 0.125 inch thick type A2 tooling steel. High strength steel bolts using standoffs and laminated steel shim stock were used to provide for varying the lateral compressive force producing the radial deflection (squeeze) of the tubular element.

In the device of FIGS. 1, 2, 3, and 4, the dowels, such as 29', may be inserted advantageously between the tubes 26 of FIGS. 1–3 or tubes 40 of FIG. 4. The diameter of the dowels would be adjusted to accommodate the annulus allowing for compression of the tubes. Thus, for example, where tubes are inserted between adjacent wall surfaces 0.488 inch apart dowels of approximately that diameter (0.488 inch) would be utilized at spaced intervals, preferably 4 in FIG. 4, for example, allowing two tubes, 40 by way of illustration in FIG. 4 between adjacent dowels and them omitting if desired the dowels 29 within the tubes 26 and 40. The tubes of approximately one-half inch of 304 stainless steel and 0.060 inch wall thickness have proven advantageous with 0.488 inch dowels thereadjacent. Alternatively the dowels can be used in all spaces between tubes, or some spaces.

A series of measurements was made of the rolling force as a function of the radial deflection for each set of tubes of the various wall thicknesses. These data show the increase in rolling force with tube wall thickness for a given amount of radial deflection and with radial deflection for a given tube or thickness. A set of design curves based on these results was prepared.

The initial rolling force generally is greater than the value achieved after a few rolling cycles. This latter force is the value after the cyclic stress strain behavior has stabilized and is practically constant thereafter.

During the conduct of these measurements it was noted that the force level tended to stabilize very rapidly. Accordingly means for eliminating the initial peak force is to precycle the tubes prior to operation; in practice this can be accomplished during the inspection procedure.

From the data derived it was also noted that the higher compression forces required to produce a specified radial deflection of the thicker wall tubular elements is prone to produce a state of instability. By introducing the dowel inserts into the tubes, stability is substantially improved. As a direct consequence, it was established that units can be designed to operate at substantially higher compressive forces (squeeze) thereby developing much higher operating (rolling) forces.

To insure that the compressed tube will roll rather than slide the lateral compressive force must be related to the rolling force and the coefficient of friction. A typical design produces a breakaway friction or sliding force twice that of the rolling force.

The design parameters have thus been established as described in the foregoing, together with the analytical procedures, it becomes possible to design and construct both linear and rotary energy absorbers utilizing the rolling-tube cyclic strain energy absorption concept. The units described above include a linear unit as well as one providing rotary motion. It will be observed that the rotary design differs from the linear device only in the use of the drums or cylinders which replace the flat plates of the linear energy absorbing device. In the rotary device the amount of compressive force (squeeze) is controlled by the spacing between the inner and outer drums and the diameter of the tubular element. The number and size of the tubular elements determines the total rolling force for a given compressive force of the tubular material.

The foregoing disclosure is representative of preferred forms of the invention and is to be interpreted in an illustrative rather than a limiting sense, the invention to be accorded the full scope of the claims appended hereto.

What is claimed is:

1. An energy absorbing arrangement comprising, in combination: a first rigid body member and a second rigid body member spaced a preselected distance therefrom for relative motion therebetween; a tube-like deformable energy absorbing means positioned between said first and said second rigid body members having an unstressed outside diameter greater than said preselected distance, and a preselected inside diameter, and deformed in radial directions by said first and second body member, for energy absorbing rolling motion therebetween for said relative motion between said first and second rigid body member; and a cylindrical, rigid nondeformable retainer means positioned within said tube-like energy absorbing means and having a diameter less than said preselected inside diameter of said tube-like energy absorbing means, for limiting the radial deformation of said tube-like energy absorbing means to prevent stress relieving plastic flow thereof, said first and second rigid body members comprising a cylindrical body member and a plurality of outer cylindrical body members with the tube-like members captured between the inner body member and the outer cylindrical body members.

2. An arrangement as in claim 1, wherein said outer body members comprise pairs of cylindrical body members spaced from the inner cylindrical body member to position to hold the tube-like members therebetween.

3. An arrangement as in claim 1, wherein there is a single tube-like member coaxial with an inner cylindrical member and in a position between the outer cylindrical body members and the inner cylindrical body members.

* * * * *